Patented July 9, 1929.

1,719,944

UNITED STATES PATENT OFFICE.

FELIX RISSE AND ERICH FISCHER, OF HOCHST-ON-THE-MAIN, GERMANY, ASSIGNORS TO GRASSELLI DYESTUFF CORPORATION, OF NEW YORK, N. Y., A CORPORATION OF DELAWARE.

PROCESS FOR PRESERVING DIFFICULTLY-SOLUBLE DYESTUFFS IN A STATE OF FINE DIVISION AND THE RESULTING COMPOSITION.

No Drawing. Application filed April 5, 1927, Serial No. 181,259, and in Germany April 22, 1926.

Our present invention relates to a process for preserving insoluble or difficultly soluble dyestuffs in a state of fine division and to the composition of matter resulting from said process.

It is known that dyestuffs which, when prepared, are per se in a state of fine division change their physical properties on standing for a longer time and assume a coarse or crystalline form whereby their suitability for being used later on is impaired.

Now we have found that insoluble or difficultly soluble dyestuffs retain their original physical properties, particularly their state of fine division, if, before they have changed this state, alkyl cellulose is incorporated into them.

Therefore the alkyl cellulose may be added either during the preparation of the dyestuffs or soon after their preparation and preferably immediately thereafter. It may be mentioned that the incorporation of the alkyl cellulose into the dyestuffs during their production does not cause the formation of sols, but that the dyestuffs can be filtered at ordinary temperature without any difficulty.

The following examples serve to illustrate our invention but they are not intended to limit it thereto; all parts being parts by weight.

(1) 263 parts of 2-hydroxy-3-naphthoic acid anilide are dissolved in a mixture of 195 parts of caustic soda solution of 40° Bé. and about 1200 parts of water and there are then added thereto 50 parts of an aqueous solution of methyl cellulose of 20% strength. The solution thus obtained is run into a mixture of 100 parts of acetic acid and about 1000 parts of ice water, during which operation the anilide separates. Into the coupling suspension so prepared is run a diazo solution, produced in the usual manner from 196 parts of 4-nitro-2-aminobenzoic acid methylester. After the coupling process is complete, the separated dyestuff forms a scarlet-red colored paste, which does not change its physical properties even when stored for a considerable time.

(2) 144 parts of β-napthol are dissolved in the usual manner in a caustic soda solution and this solution is poured, while stirring, into a mixture of an excess of acetic acid and ice. The suspension so obtained is acted upon with a diazo solution produced in the usual manner from 152 parts of 3-nitro-4-amino-1-methylbenzene. After the coupling process is complete, the mass is filtered by suction. The resulting paste is intimately mixed with 31 parts of a solution of methyl cellulose of 20% strength, (these 31 parts being 10% of the calculated weight of the dry dyestuff) and then constitutes a homogeneous, permanently stable, red paste.

The methods, as described in the foregoing examples, of preparing permanently stable, finely subdivided pastes may not only be used in the manufacture of azo dyestuffs but in the preparation of any other difficultly soluble or insoluble dyestuffs, for instance vat dyestuffs, oxidation dyestuffs, for example aniline black or the like. With these dyestuffs the procedure would be as follows:

(a) The addition of the methyl cellulose to the dyestuffs is to be carried out at the moment of the formation of the dyestuffs, that is to say, in the case of vat dyestuffs when their vats are oxidized for instance by blowing them out, and in the case of oxidation dyestuffs, while they are being oxidized.

By blowing out the vats for oxidation, it is understood that air is blown through the vat, so that the vat is oxidized and the dyestuff precipitated. This oxidation can certainly be done also with potassium ferricyanide or other oxidation agents.

(b) The incorporation of the methyl cellulose into the dyestuffs is effected shortly after they are produced according to Example 2.

For treating vat dyestuffs according to our invention a solution of methyl cellulose is added to the dissolved vat and after oxidizing the vat, the dyestuff particles, at the moment of their formation, absorb the methyl cellulose.

The quantity of the akyl cellulose to be added must, of course, be varied according to the kind of dyestuff and according to the purpose for which it is to be used. Consequently dyestuffs which have the tendency to become quickly crystallized or coarse-grained require the addition of a larger quantity of alkyl cellulose than those dyestuffs which have this tendency only to a small extent.

The pastes obtainable by our new process in a finely sub-divided homogeneous form may be not only worked up into color lakes, for instance with aluminium sulfate for use in printing or with aluminium sulfate and barium chloride for use in wall-paper making, but they may also with particular advantage be used without the addition of a substratum for instance as printing colors for paper or as body colors for leather, for which purposes they are mixed with one of the usual agglutinating or fixing agents.

Of course, the dyestuffs may also be brought into a dry powdered form and be used in the usual manner for the preparation of oleaginous printing colors and color lakes; also in these cases they remain in a state of fine division.

We claim:

1. The process for preserving difficultly soluble dyestuffs in a state of fine division, which consists in incorporating alkyl cellulose into the said dyestuffs, before they have changed their original state of fine division.

2. The process for preserving difficultly soluble dyestuffs in a state of fine division, which consists in incorporating methyl cellulose into the said dyestuffs, before they have changed their original state of fine division.

3. As new compositions of matter dyestuff preparations comprising a difficultly soluble dyestuff in a state of fine division and an alkyl cellulose.

4. As new compositions of matter dyestuff preparations comprising a difficultly soluble dyestuff in a state of fine division and methyl cellulose.

In testimony whereof, we affix our signatures.

FELIX RISSE.
ERICH FISCHER.